No. 14,602.

G. W. FLANDERS.
FLOOD GATE.

PATENTED APR. 8, 1856.

UNITED STATES PATENT OFFICE.

GEO. W. FLANDERS, OF LYNN, MASSACHUSETTS.

FLOOD-GATE.

Specification of Letters Patent No. 14,602, dated April 8, 1856.

*To all whom it may concern:*

Be it known that I, GEORGE W. FLANDERS, of Lynn, in the county of Essex and State of Massachusetts, have invented a new and useful Improvement in Flood-Gates; and I do hereby declare that the following is a full, clear, and exact description of the same, reference being had to the annexed drawings, making a part of this specification, in which—

Figure 1:
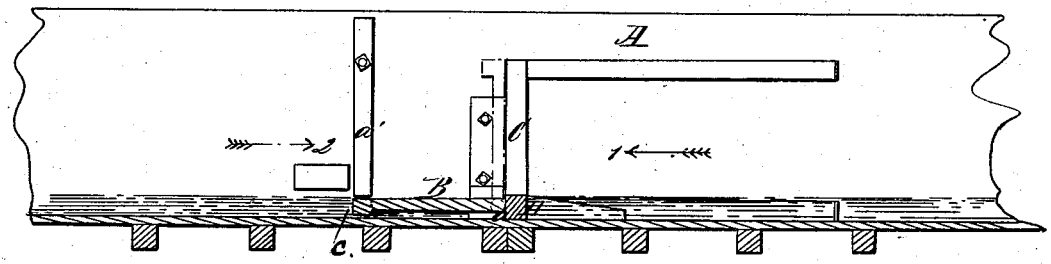
Figure 2:
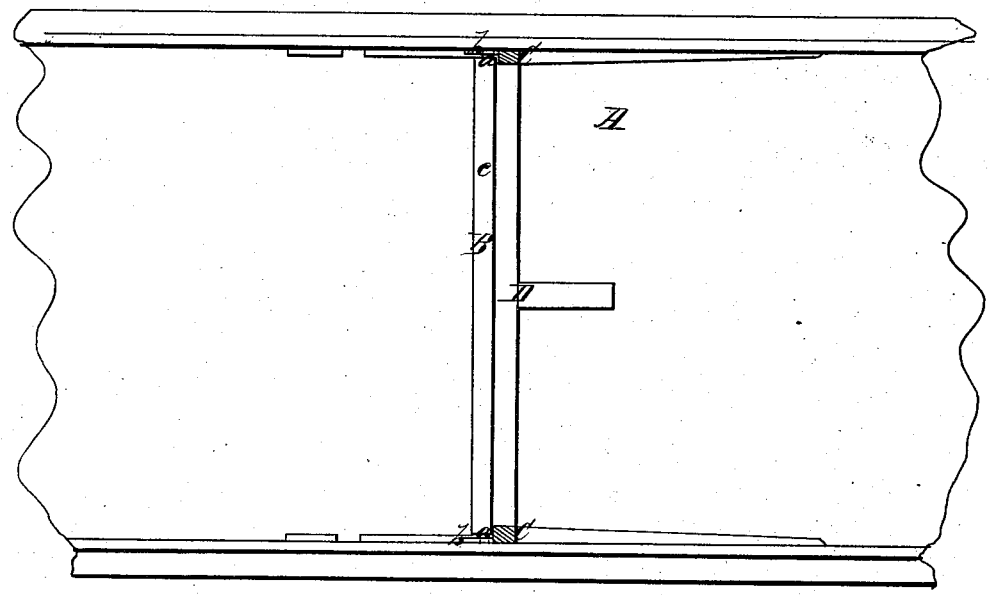

Figure 1, is a longitudinal vertical section of a flume, with my improved gate hung within it, and bisected transversely through the center. Fig. 2, is a plan or top view of the same.

Similar letters of reference indicate corresponding parts in the two figures.

My invention consists in constructing the gate of one part only, the gate being hung to the bottom of the flume as will be presently shown and described.

To enable others skilled in the art to fully understand and construct my invention, I will proceed to describe it.

A, represents a flume, constructed in the usual or any proper manner, and B, represents the gate, the lower part of which has wooden journals or gudgeons (a) (a) attached to it, one at each side. These journals are fitted in sockets or bearings (b) (b) attached to the sides of the flume adjoining its bottom.

The gate B, is formed of one part only, and is of course equal in length to the width of the flume A, whatever the width of the flume may be. The upper part of the gate has a rail or beam (c) bolted to it, in order to stiffen it, and prevent its springing when subjected to the pressure of a full head of water. The sides of the flume have each an upright cleat or post C, attached to them, which cleats or posts serve as bearings for the gate when it is elevated as shown in red in Fig. 1.

The gate may be constructed of either wood or metal. If constructed of metal, boiler plate iron may be used, the top rail or beam (c) being of wood and sufficiently large to cause the gate to float.

The gate when the tide is rushing into the pond through the flume A, as indicated by arrow 1, will be thrown over horizontally, and when the tide begins to fall and pass in the direction indicated by arrow 2, the water will raise the gate and close it, the gate gearing against the cleats or posts C, C, the lower part of the gate bearing against a threshold D, on the apron or bottom of the flume.

The advantages of the above improvement are that the gate can be constructed cheaper than the gates now made, not so liable to leak, nor be obstructed by ice, nor is it liable to sag. The necessity of employing caps on which to hang the gates are also dispensed with, and consequently no obstruction is presented to boats, rafts, etc., which may pass through the flume at high water. The gate may be applied to canal locks, dry docks, tide mill ponds, etc.

If necessary the gate may be raised and lowered by chains, the ends of which may be secured to winches at each end of the flume and the gate may also be kept in a horizontal position or open by posts (a') on the sides of the flume, these would be necessary only in case the chains are not used, and when the water is to be let out of the pond.

Having thus described my invention, what I claim as new and desire to secure by Letters Patent, is—

Constructing the gate of one part, and hanging or hinging its lower end to the apron or bottom of the flume A, substantially as described in the body of the specification.

GEORGE W. FLANDERS.

Witnesses:
   O. B. COOLIDGE,
   FRANCIS PARTON.